Sept. 15, 1964     D. A. FREEMAN     3,148,807
AUTOMATIC HANGING FOLDER
Filed Nov. 24, 1961                                    8 Sheets-Sheet 2

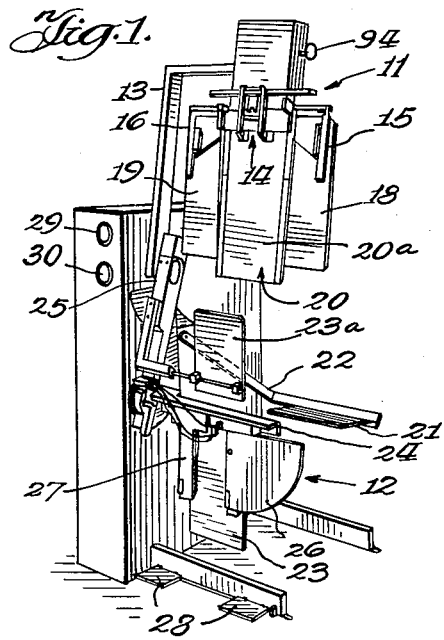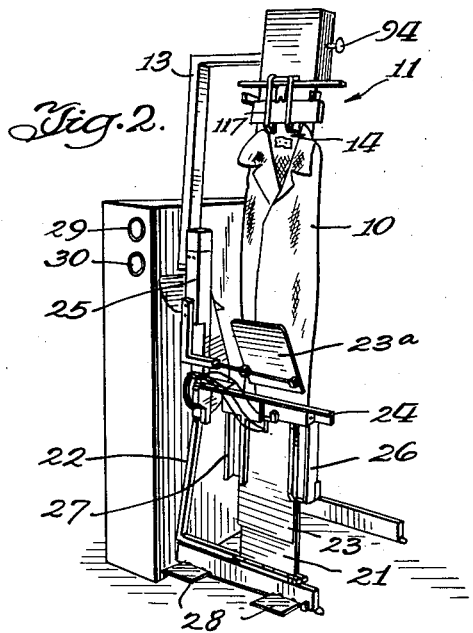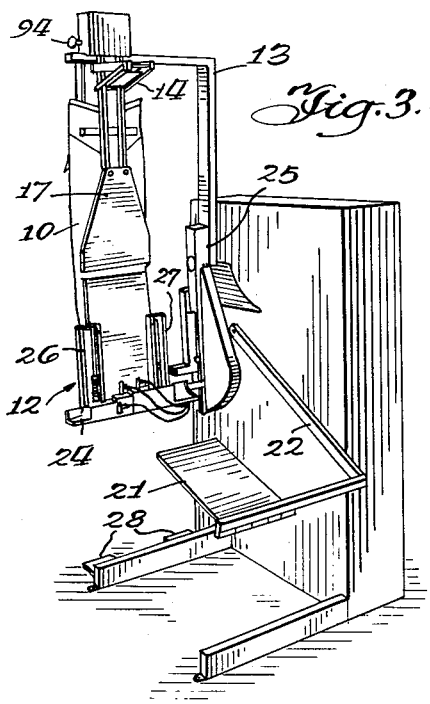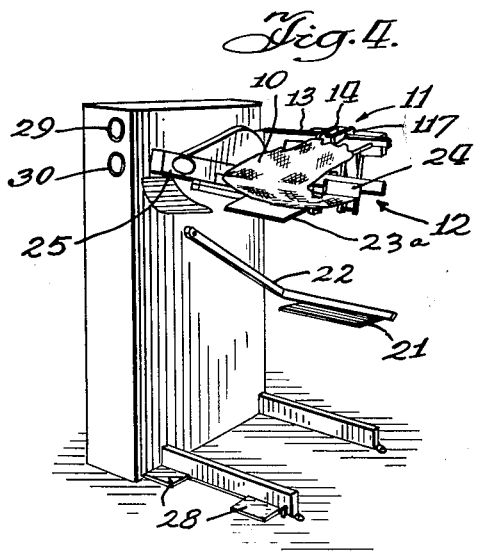

Inventor
David A. Freeman
By Snider, Dressler, Goldsmith & Clement
Attorneys

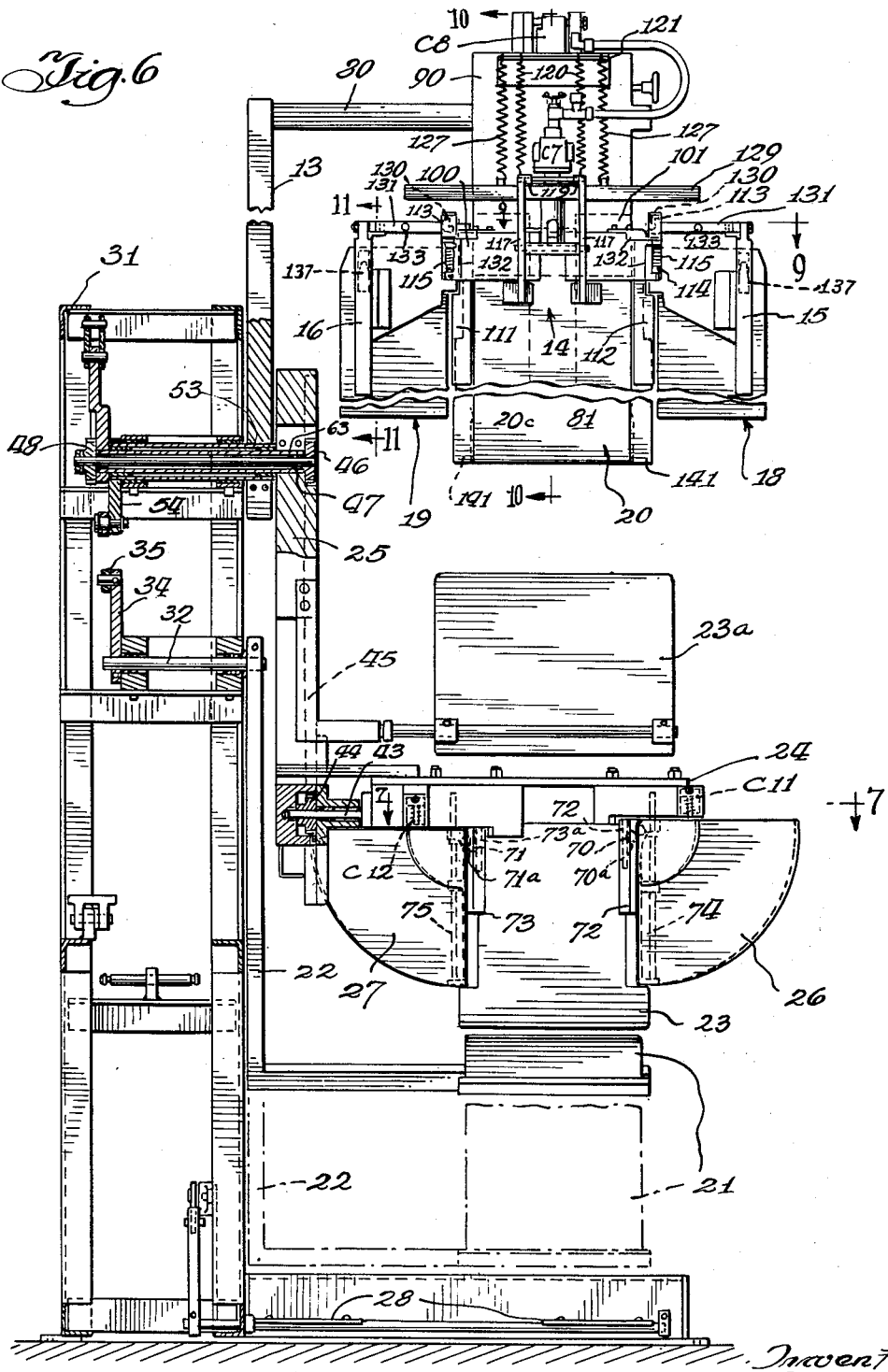

Sept. 15, 1964 D. A. FREEMAN 3,148,807
AUTOMATIC HANGING FOLDER
Filed Nov. 24, 1961 8 Sheets-Sheet 4

Inventor
David A. Freeman
By Schneider, Dressler, Goldsmith & Clement
attorneys

Sept. 15, 1964     D. A. FREEMAN     3,148,807
AUTOMATIC HANGING FOLDER
Filed Nov. 24, 1961     8 Sheets-Sheet 5
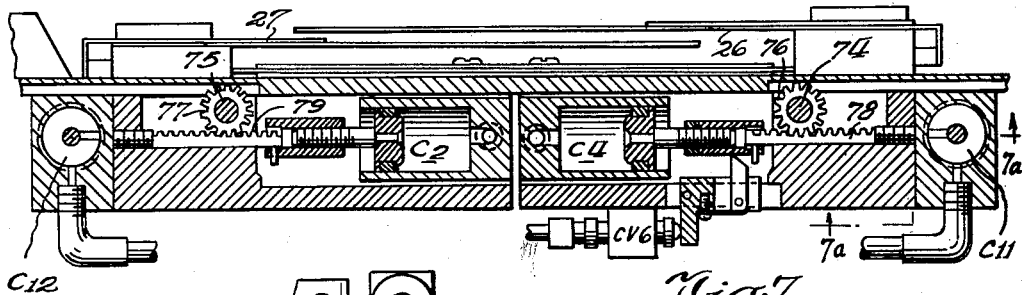
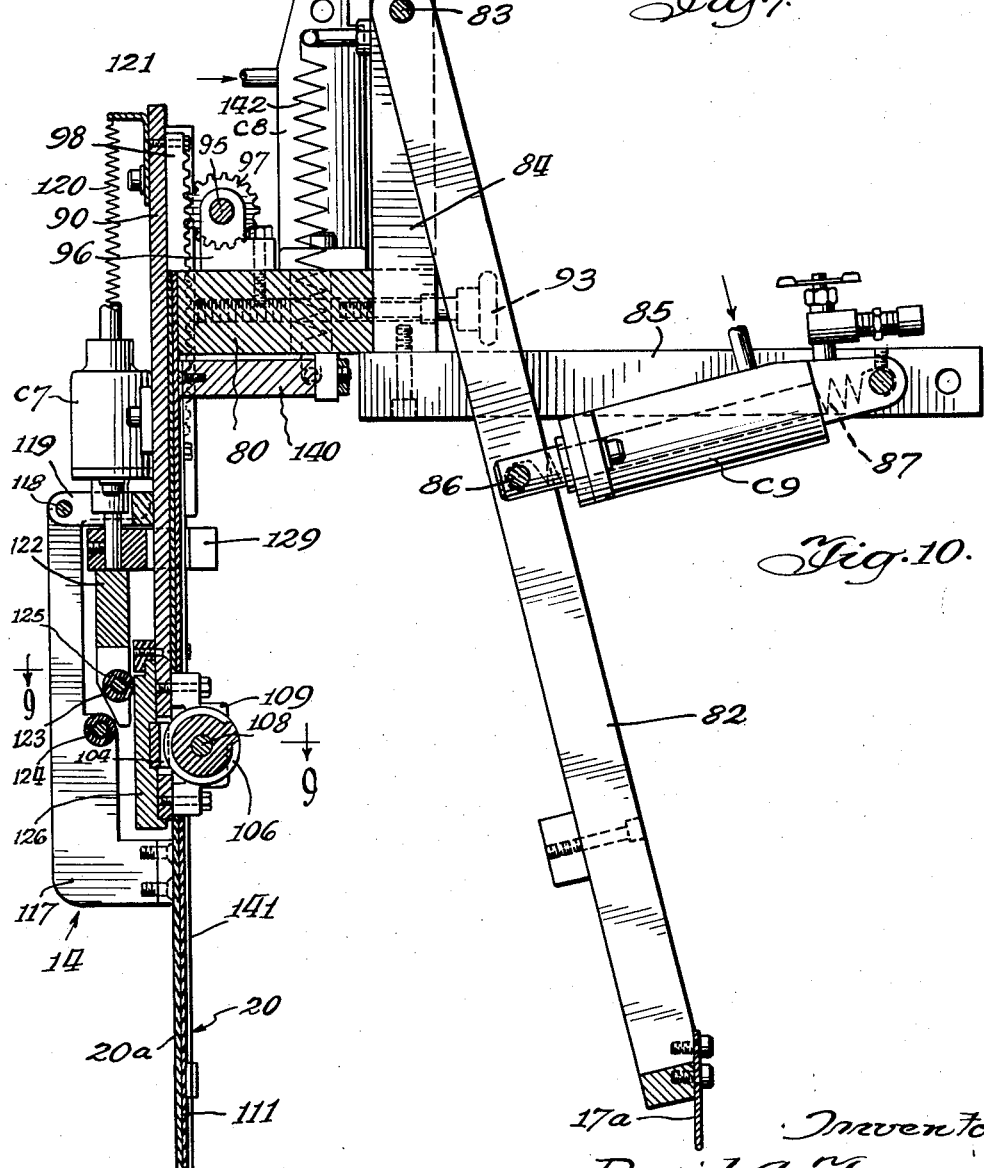

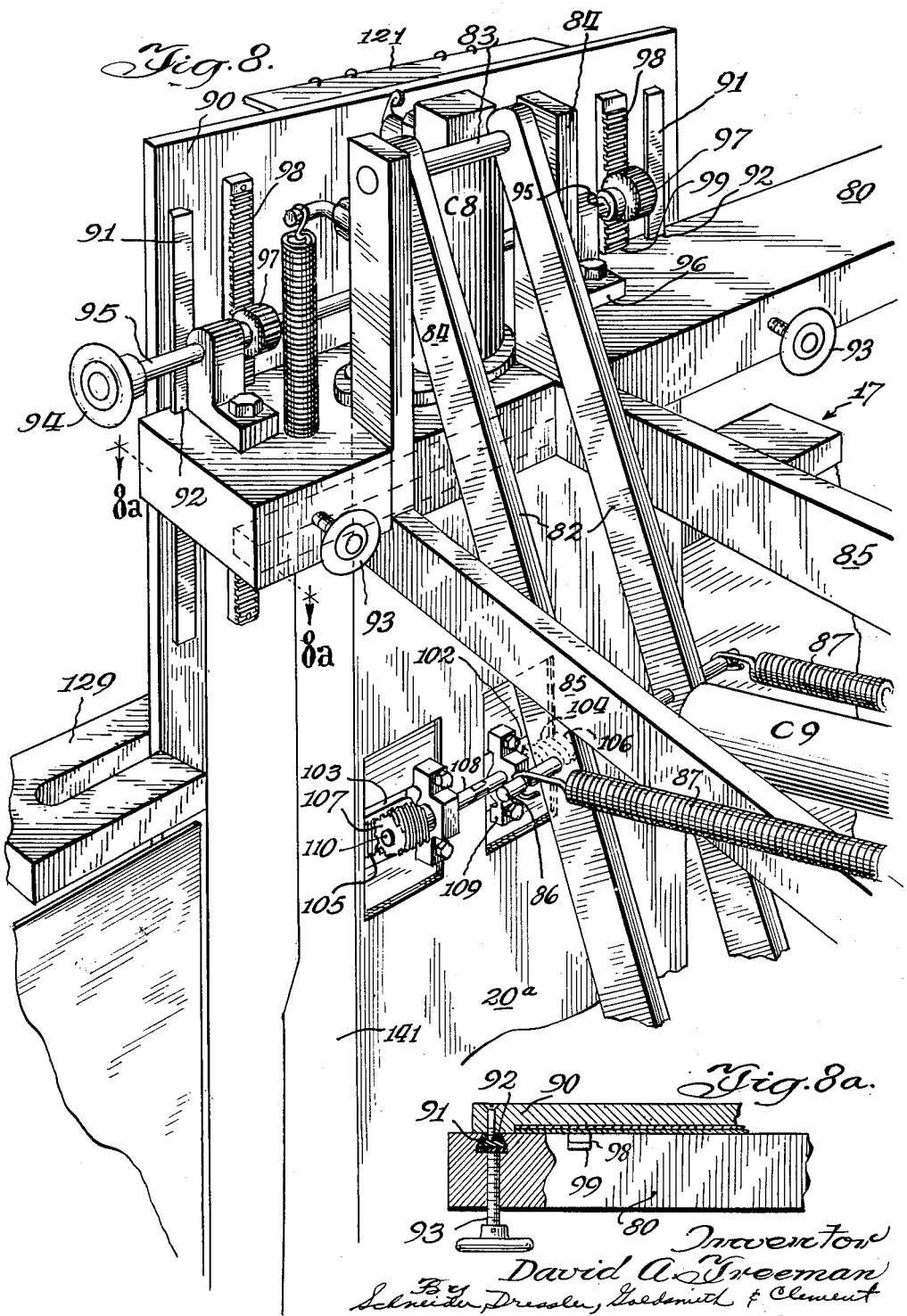

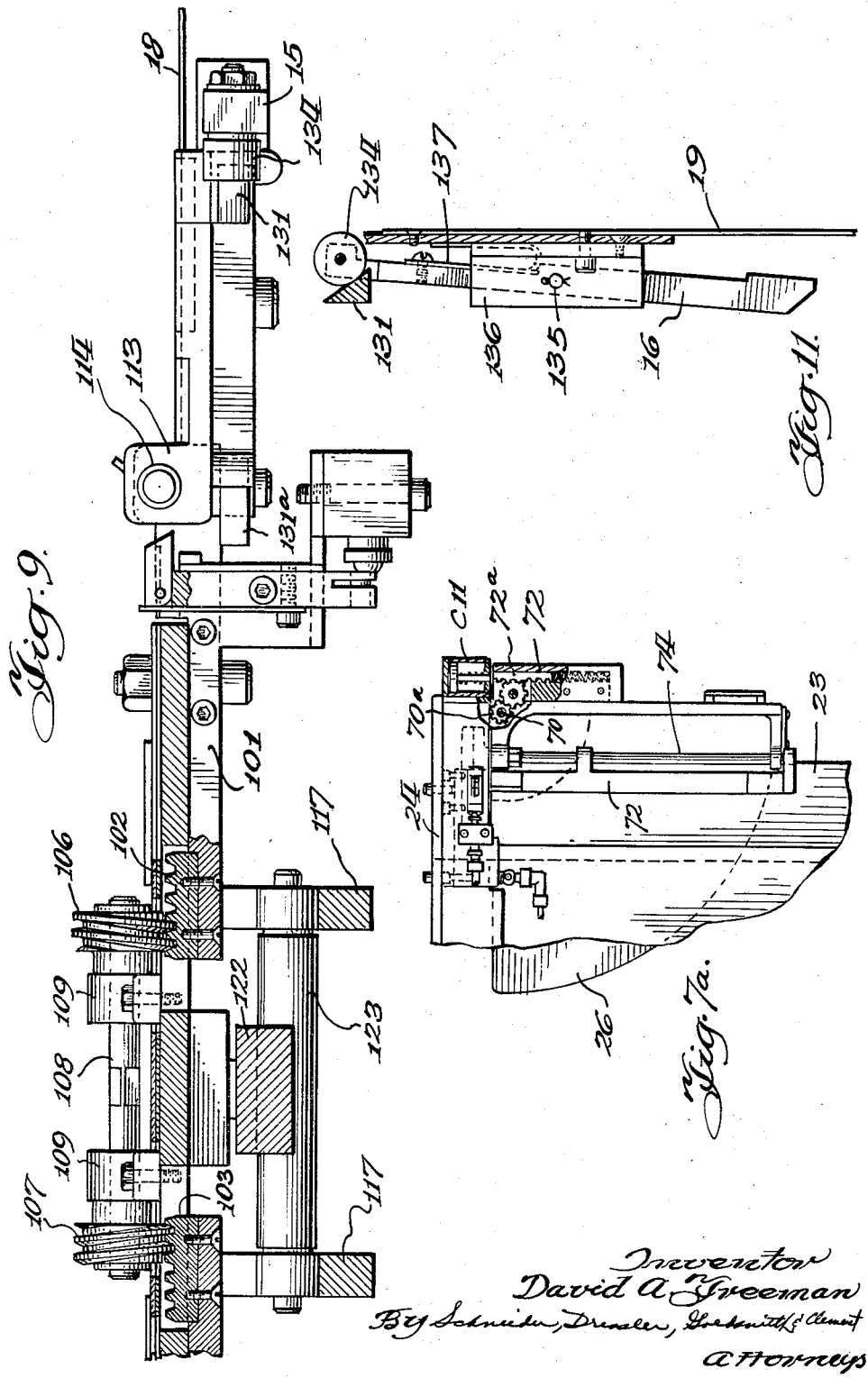

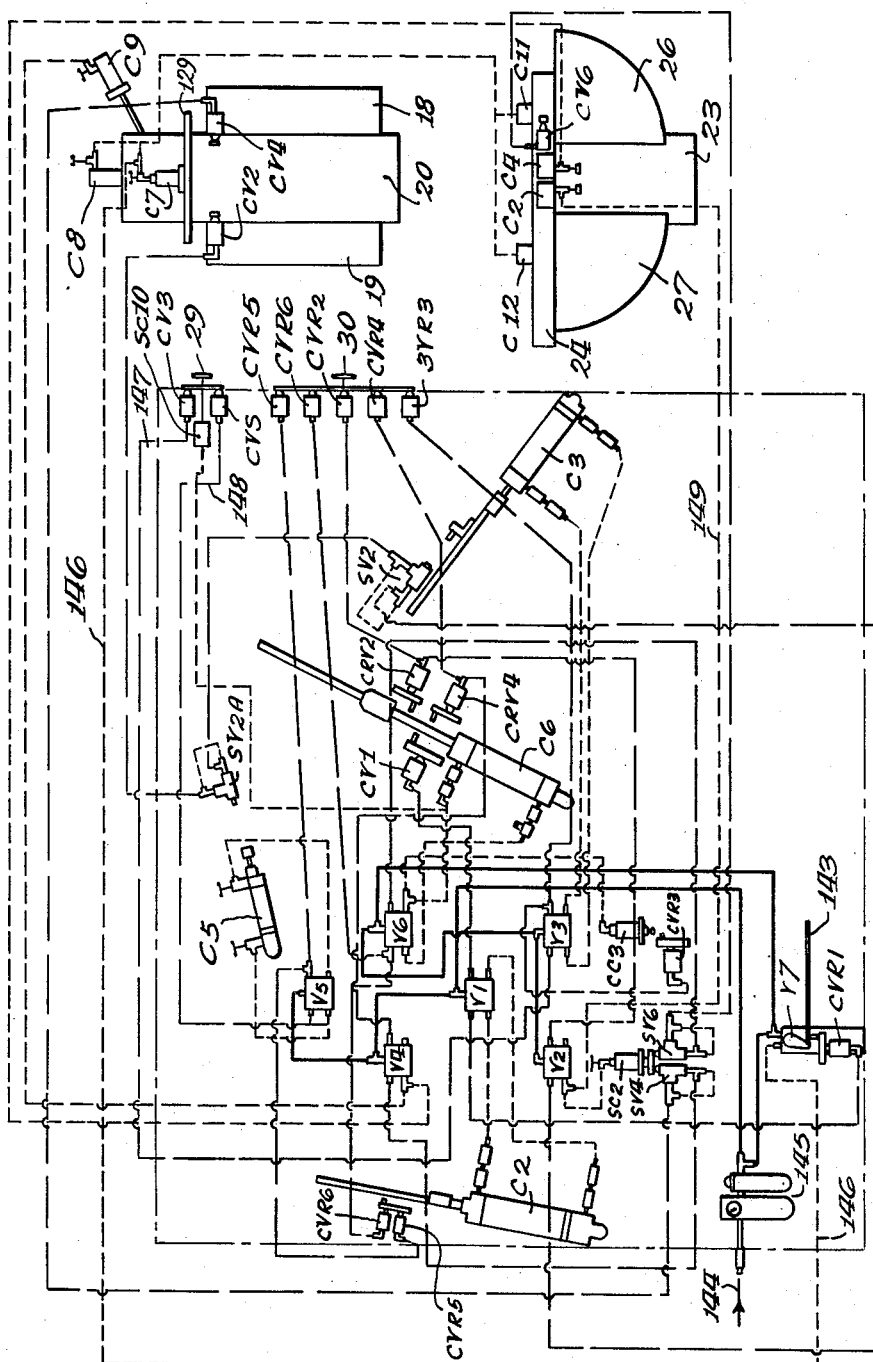

United States Patent Office 3,148,807
Patented Sept. 15, 1964

3,148,807
AUTOMATIC HANGING FOLDER
David A. Freeman, 1550 Lake Shore Drive,
Chicago, Ill.
Filed Nov. 24, 1961, Ser. No. 154,738
11 Claims. (Cl. 223—37)

The present invention relates to folding devices and methods of folding, and more particularly, to vertical hanging devices substantially automatically folding flexible material while suspending the same in a substantially vertical position.

Devices embodying the present invention have wide utility in the field of folding flexible material such as fabric and plastic materials and articles made therefrom. For example, devices embodying this invention may be used to fold plastic bags and covers, sheets, towels and blankets. They also may be used for folding such articles as garments including shirts, shorts, dresses and coats. In the following description of an illustrative embodiment of this invention, the invention is described in conjunction with folding a long garment, particularly, a coat of the type known as a shop coat. It should be understood that the particular garment discussed hereinafter in conjunction with the description of the device described in detail and the method of folding the same is intended to be illustrative only, and reference thereto is intended to be generic to any article that may be folded. There is no intention to limit either the invention or this embodiment thereof to the folding of any particular type, style or kind of article.

The art of folding devices is a highly developed art. Most successful devices for folding articles of clothing are horizontal operating units wherein the garment is spread out on a table, smoothed and straightened and then in manual or automatic, or semi-automatic, fashion, the folding device is set into operation. Vertical operating devices, wherein the garment is suspended, that have been known usually operated merely as suspension or hanging devices requiring manual operation for most of the folding steps. It will be appreciated that in folding long articles, and even some short ones, the job of straightening and smoothing the same preparatory to folding can be much more efficiently accomplished when the article is suspended and the folding operation can be watched more carefully to avoid wrinkling of the article.

The foregoing and numerous other features and advantages of the present invention will be readily apparent from the following detailed description of an illustrative embodiment thereof, and from the drawings in which it and every detail shown is incorporated as a part of this specification, in which like reference numerals refer to like parts, and in which:

FIGURE 1 is a right front perspective view of an automatic folding device incorporating the principles of this invention;

FIGURE 2 is a view similar to FIGURE 1, but showing the device with a garment held and suspended thereby with the sides of the garment folded;

FIGURE 3 is a right rear perspective view of the machine with the lowermost portion of the tail of the garment folded;

FIGURE 4 is a right front perspective view of the machine with the garment thereon fully folded and ready for removal;

FIGURE 6 is a broken, front, partly sectional view taken substantially along the broken line 6—6 of FIGURE 5 with parts of the machine removed for clarity;

FIGURE 7 is a transverse sectional view of the tail folding mechanism taken substantially along the line 7—7 of FIGURE 6;

FIGURE 7a is a front fragmental sectional view taken substantially along the line 7a—7a of FIGURE 7;

FIGURE 8 is a right rear perspective view of the shoulder folding mechanism;

FIGURE 8a is a fragmental sectional view taken substantially along the line 8a—8a of FIGURE 8;

FIGURE 9 is a fragmental tranverse sectional view of the shoulder folding mechanism taken substantially along the line 9—9 of FIGURES 6 and 10;

FIGURE 10 is a vertical sectional view of the shoulder folding mechanism taken substantially along the line 10—10 of FIGURE 6;

FIGURE 11 is a sectional view of the shoulder clamping mechanism taken substantially along the line 11—11 of FIGURE 6; and FIGURE 12 is a diagrammatic and schematic illustration of the pneumatic system utilized in this embodiment of the device.

Figure 5:
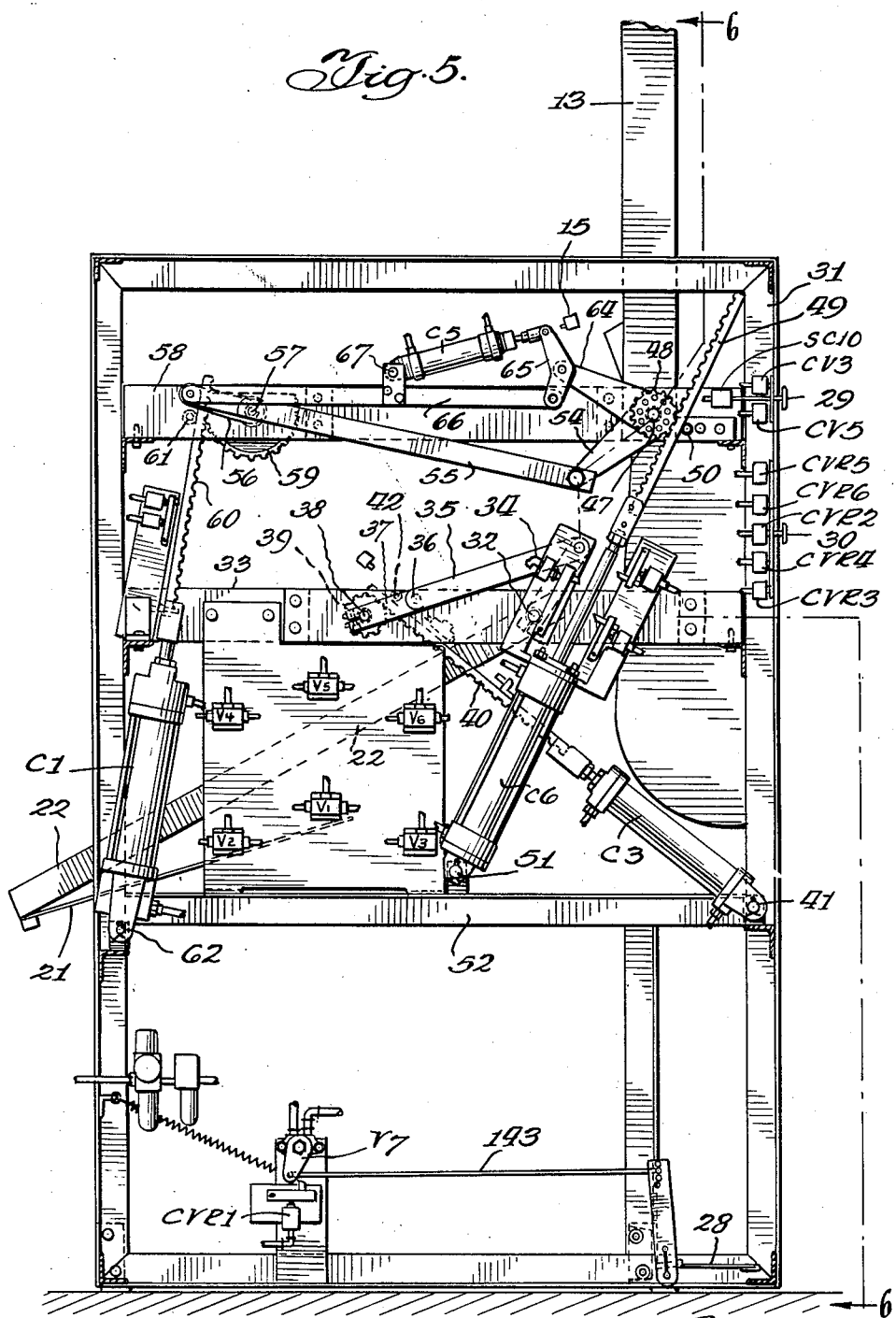
FIGURE 5 is a partial left side elevational view of the machine with the covers removed therefrom.

The automatic hanging folder illustrated in the drawings is effective to accept a shop coat 10 by clamping the same, and when set in operation through proper operator activity, to fold the same. The machine is shown in an open, starting position in FIGURE 1 generally illustrating the garment holding and folding operations of the mechanism and the operator controls therefor. As shown in FIGURE 1, the machine has a shoulder clamping and folding assembly 11 and a tail clamping and folding assembly 12. Both of these assemblies are adjustable as hereinafter described so that they may fold garments of greater and lesser width and greater and lesser length into folded packages of controllable, adjustable width and length.

The shoulder folding mechanism 11 is supported on an arm 13 and includes a central or collar clamp 14, right and left side shoulder clamps 15 and 16 and a back clamping blade 17 shown in FIGURE 3.

The right and left shoulder clamps are carried on right and left side shoulder blades 18 and 19, respectively, to clamp the shoulder portions of the coat thereagainst for proper suspension and folding of the garment to be folded. The collar clamp mechanism 14 is effective to clamp the collar of the garment against a central pattern blade 20 about which the garment is folded. The relative height of the collar clamp 14 with respect to the bottom edge of the pattern blade 20 determines the length of the ultimate folded package, while the width of the pattern blade and the lateral adjustment of the side folding blades 18 and 19 with respect thereto determine the width and tautness of the folded package.

The tail folding and clamping mechanism includes a tail back clamping blade 21 mounted on an arm 22 arranged to swing forward and rearward toward and away from the tail folding mechanism disposed on the front of the machine. This latter mechanism includes a tail folding pattern blade 23 mounted on a transverse rotatable arm 24 that is in turn mounted on a swinging arm 25 arranged to move forwardly and rearwardly of the machine. In this embodiment of the invention, swinging arm 25 for the tail folding mechanism swings about the same axis as the arm 13 for the shoulder folding mechanism.

The tail folding mechanism 12 also includes right and left side tail tip and side folding arms or blades 26 and 27 mounted on pivots that are parallel to the right and left edges of the tail pattern blade 23.

In the operation of the machine as illustrated in FIGURES 1–4, inclusive, the operator starts with the machine in the position shown in FIGURE 1. While holding a coat to be folded, in the shoulder area thereof, the operator steps on a foot pedal control 28 which operates the pneumatic system to open the collar clamp 14 and the right and left side shoulder clamps 15 and 16. While holding the foot pedal depressed, the operator places the collar of the coat between the collar clamp 14 and the pattern blade 20 and properly positions the same with respect thereto. She then releases the foot pedal permitting the collar clamp 14 to remain closed. At this stage of folding, the shoulder clamps remain open and the garment suspended by the collar clamp with the tail portion of the garment disposed behind the tail pattern blade 23, but in front of the tail clamping blade 21, which is disposed in its rearward position as shown in FIGURES 1 and 3. The operator then places the shoulders of the garment between the shoulder clamps and the respective shoulder and side folding blades and by slight pivotal movement of the blades and clamps about the vertical axes causes the shoulder clamps 15 and 16 to close and clamp the shoulder portions of the garment against the shoulder and side folding blades.

With the garment so suspended, the operator has both hands free to properly straighten and button the coat, if so desired, or pin the same. She then presses a control button 29 to actuate the pneumatic system so that the arm 22 and tail clamping blade 21 are lowered and brought forward while the remainder of the tail clamping mechanism moves slightly rearward. The limit of movement of these two portions of the tail clamping mechanism as a whole is the vertical center plane of the garment and is shown in FIGURE 2.

The operator then grasps the shoulder folding blades and successively pivots the left shoulder folding blade and the right shoulder folding blade about their respective axes 180° to their folded positions behind the shoulder pattern blade. By virtue of operation of the pneumatic system pivoting the left shoulder blade about its axis causes the left tail tip folding blade 27 to be moved about its axis whereby the whole left side of the garment is folded along a single adjusted line in one sweeping motion. Similarly, folding the right shoulder blade about its axis to its closed, folded position behind the pattern blade 20 actuates the pneumatic system to cause the right tail tip folding blade to pivot about its axis, thereby folding the whole right side of the garment in one sweeping motion. When the right side is folded, the pneumatic system is automatically actuated to close the back clamp 17 on the shoulder folding mechanism to hold the back and shoulder portion of the garment firmly in position. This condition of the folding mechanism is shown in FIGURE 2.

When the mechanism reaches the condition shown in FIGURE 2, the pneumatic system automatically moves the mechanism through the position shown in FIGURE 3 to the position shown in FIGURE 4. Step by step, it operates as follows: The arm 22 swings rearwardly carrying the tail clamping blade 21 with it in a coordinate motion with pivotal movement of the tail pattern blade 23 and the folding blades 26 and 27 as these blades are pivoted about a horizontal axis in the arm 24. This removes the clamping blade 21 from the garment as the pattern and folding blades for the tail move upward to the position shown in FIGURE 3, folding the tail of the garment about the upper edges of the tail folding blades 26 and 27. The tail folding blades 26 and 27 fold the sides of the tail portion of the garment about the clamping blade 21 as well as about the pattern blade 23, thus making it necessary to remove the clamping blade 21 from the garment for effective folding and ultimate removal of the garment in a folded position from the folding mechanism.

When the mechanism reaches the stage shown in FIGURE 3, its automatic operation continues with the arms 13 and 25 swinging about their single axis to fold the garment about the lower edge of the pattern blade 23, which edge has become the upper edge thereof as above described, and the lower edge of the pattern blade 20 to finish folding the garment and dispose the garment and the mechanism in the position shown in FIGURE 4.

With the garment 10 fully folded, the operator may band or pin or bag the garment, as described, and remove the same in that condition or simply remove the garment without securing the same. For removal, the operator simply steps on the foot pedal 28. This actuates the pneumatic system to release the collar and shoulder clamps. At the same time, the pneumatic system operates an ejector which partially pushes the folded garment toward the operator from the pattern blades 20 and 23.

Simultaneously with or immediately preceding the pneumatic operation of the ejector, the pneumatic system which is energized when the operator depresses the foot pedal 28, causes the tail side folding blades 26 and 27 to pivot outwardly about the pivotal mountings thereof on blocks attached to the arm 24. Movement of these blades in their own plane removes them from the garment and permits unstrained ejection of the garment from the folding mechanism.

To provide continuous support for the folded garment when the side folding blades are removed therefrom, a holding blade 23a is carried by the arm 25 and is disposed in a position normally above the pivot arm 24 and aligned with the tail pattern blade 23. When the garment is in a fully folded position as shown in FIGURE 4, the holding blade 23a is disposed in a substantially horizontal plane beneath the tail of the garment and supports the same.

It should be understood, of course, that the pivotal movement of the side folding arms on the tail folding mechanism outwardly about the pivots thereof may be effected without special pneumatic actuating means. To this end, these blades may be spring biased to the normal position thereof, with removal of the garment effecting rotation of the blades against the force of the biasing springs.

When the ejection mechanism is operated, as noted above, it partially pushes the folded garment toward the operator. The operator then simply continues the forward motion of the garment by pulling the same from the pattern blades.

When the operator releases the foot pedal and after removing the garment from the machine, the return of the foot pedal to its normal position actuates the pneumatic system to return the mechanism to its fully opened, unfolded position as shown in FIGURE 1, automatically. If, during any stage of the operation the operator desired to bring the mechanism back to a fully opened, unfolded position, she need only press a reset control button 30 on the face of the machine. This button operates reverse cycling valves such that the pneumatic system will automatically return the mechanism to the starting position shown in FIGURE 1.

The details of the mechanism forming this illustrative embodiment of the present invention are discussed below. Following that discussion is a detailed discussion of the pneumatic system for operating the mechanism.

The Drive Mechanism

Figure 6A:
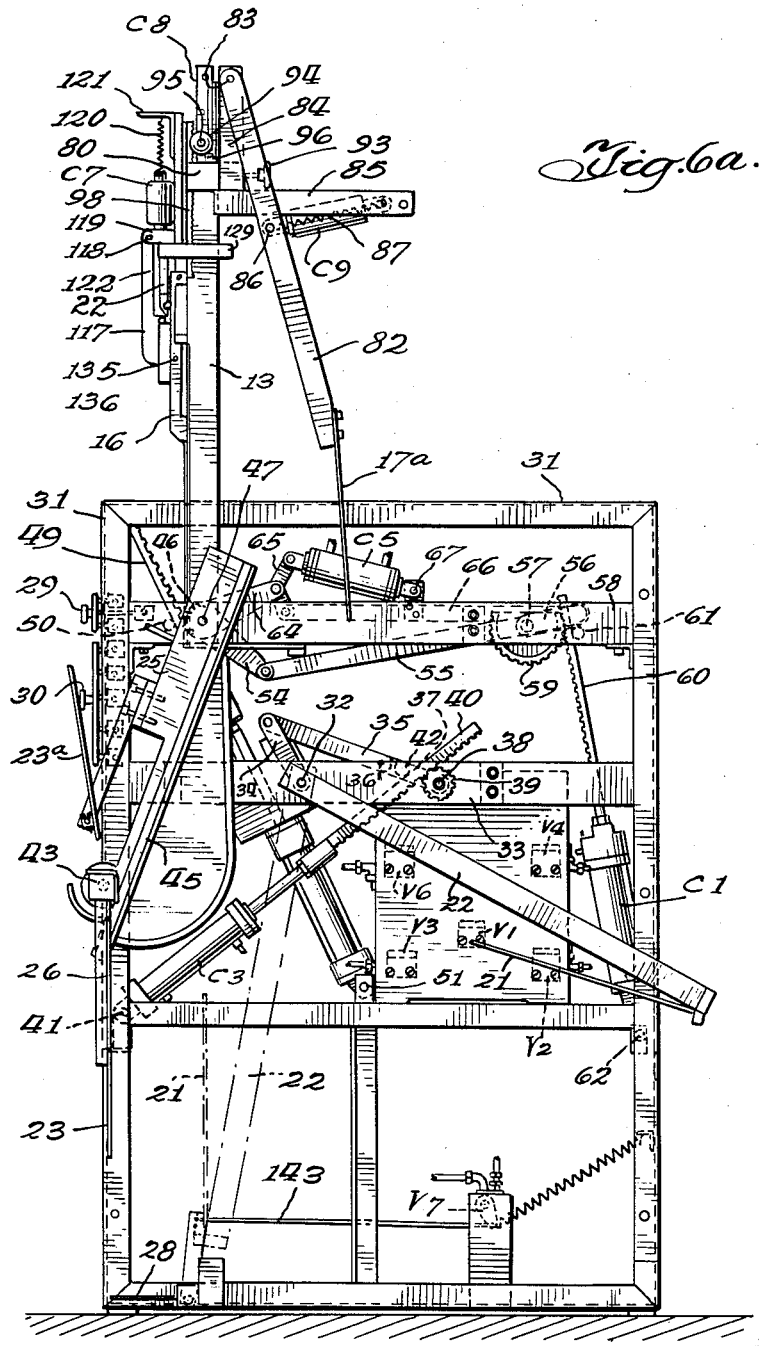
FIGURE 6a is a fragmental right side view of the machine with the covers and certain other parts thereof removed to better illustrate other parts thereof.

The mechanism for driving the arms 13, 22 and 25 for the shoulder folding mechanism, the tail clamping blade and the tail folding mechanism, respectively, and for rotating the arm 24 of the tail folding mechanism, is shown in FIGURES 5, 6 and 6a. The mechanism includes a base supporting structure or frame 31 on which the various drive elements and linkages are carried.

*The tail clamping arm drive.*—The tail clamping arm 22 carrying the tail clamping blade 21 moves in a plane parallel to the inner, front to rear face of the main frame and is secured at its upper end on a shaft 32 which is journaled on cross bars 33 extending transversely of the machine. Between the cross bars 33, there is also secured to the shaft a link 34, the free end of which is pivotally connected to a free link 35, the other end of which is pivotally joined at 36 to a link or crank 37 secured to a drive shaft 38. The drive shaft 38 is also journaled in the bars 33 and carries thereon a pinion 39. The pinion meshes with a rack 40 fixed on a piston rod of a cylinder C3. The head end of the cylinder C3 is pivotally connected to the frame 31 at 41. A backing roller or guide 42 retains the rack 40 in its meshed relation with the pinion 39.

Admission of air to the head end of the cylinder C3 will drive the piston rod and thereby drive the rack 40 outwardly toward the upper left hand corner of the device as viewed in FIGURE 5. This will rotate the pinion 39 counterclockwise and through the linkage interconnection which will cause the shaft 32 to rotate counter-clockwise, thus causing the arm 22 and the tail clamping blade 21 to move from the position therefor shown in FIGURES 3, 4 and 5 and in solid lines in FIGURE 6a to its tail clamping position shown in FIGURE 2, and in dotted lines in FIGURES 6 and 6a. Exhausting air from the head end of the cylinder C3 and admitting air to the piston end of that cylinder will return the tail clamping arm and blade to the initial position.

*Tail folding pivot arm drive.*—The tail folding pivot arm 24 is mounted on the tail folding swing arm 25 for rotation about its own axis during movement of the mechanism from the position shown in FIGURE 2 to the position shown in FIGURE 3. The pivot arm 24 is mounted on a cross shaft 43 journaled in the swing arm 25 near the lower or free end thereof as seen in FIGURE 6. Within the swing arm 25 the cross shaft 43 has secured thereon a pinion 44 which meshes with a rack 45 disposed for longitudinal sliding movement within the arm 25. Near the upper end of the arm there is a second pinion 46 meshing with the rack and secured on the innermost shaft 47 of a triple shaft assembly extending transversely of the frame and journaled thereon. At the left end of the shaft 47 and within the housing and frame 31, a third pinion 48 is secured to the shaft 47 and is engaged by a rack 49 which is held in meshing relation with the pinion 48 by a backup roller or guide 50. The rack 49 is carried on the end of the piston rod of cylinder C6 having its head end pivotally mounted at 51 on cross-bars 52 in the center portion of the main frame.

Admission of air to the piston end of the cylinder C6 causes the rack 49 to move inwardly, thereby rotating the pinions 48 and 46 clockwise as viewed in FIGURE 5 and counter-clockwise as viewed in FIGURE 6a. This movement of the pinion 46 moves the rack 45 upwardly in the arm 25, thereby rotating the pinion 44 and the shaft 43 counterclockwise as viewed in FIGURE 6a. When the shaft 43 rotates, it carries with it the tail folding arm 24 and the tail folding blades carried thereon from the position shown in FIGURE 2 to the position shown in FIGURE 3. Reverse operation of the cylinder C6 causes the tail folding blades to return to their normal position.

*The shoulder folding arm drive.*—To drive the shoulder folding arm 13 from its vertical position to its horizontal position, comparing FIGURES 1 and 4, the arm 13 is carried on the outer shaft 53 of the triple shaft assembly journaled in the frame 31 and is secured to the shaft 53 for rotation therewith. At its left end, the outer shaft 53 carries a crank 54, the free end of which is pivotally connected to a link 55. The other end of the link is connected to a crank 56 (FIGURE 5) secured to a shaft 57 journaled on frame bars 58 and carrying a pinion 59. The pinion is in meshed relation with a rack 60 held thereagainst by a backup roller or guide 61. The lower end of the rack 60 is secured to the piston of a cylinder C1 having its head end pivotally mounted at 62 to the frame 31.

Swinging of the arm 13 to carry the shoulder folding mechanism downward to the position shown in FIGURE 4 is effected when air is admitted to the head end of the cylinder C1. This drives the rack 60 and rotates the pinion 59 clockwise as viewed in FIGURE 5. Through the crank and linkage including the elements 54, 55 and 56, the outer shaft 53 is rotated counter-clockwise as seen in FIGURE 5, thereby rotating the arm 13 from its vertical position to its horizontal position.

Reverse movement is effected when the head end of the cylinder is exhausted and air is admitted to the piston end of the cyliner C1.

*The tail folding swing arm drive.*—The cylinder C1 is also effective to move the tail folding swing arm 25 from its vertical position. The pivot for the swing arm is the center or intermediate shaft 63 of the triple shaft assembly journaled in the frame 31 and coaxial with the shafts 47 and 53. This shaft 63 on which the swing arm 25 is secured is connected through a complex linkage to the crank 56 driven by the cylinder C1 through the rack 60 and the pinion 59.

The aforementioned linkage includes a crank 64 having its free end pivotally connected to the central region of a secondary crank 65, one end of which is connected to a linkage 66 having its other end connected to the outer end of the crank 56 on the pinion shaft 57. The other end of the secondary crank 65 is connected to the piston of a cylinder C5, the head end of which is pivotally secured to the link 66 as at 67.

This linkage accomplishes two functions. It drives the swing arm to move the same from the unfolded position of FIGURE 2 to the folded position of FIGURE 4. Also, through operation of the cylinder C5 it moves the swing arm and tail folding blades from a forwardly extended open position as shown in FIGURE 1 to a vertical clamping position as seen in FIGURE 2.

The opening and closing clamping functions are performed by the admission of air to the piston end and to the head end of the cylinder C5, respectively. When air is admitted to the piston end of the cylinder C5, the crank 65 is pivoted counter-clockwise about its connection with the link 66 and moves the crank 64 a small amount in a counter-clockwise direction. This pivots the swing arm 25 a small amount forwardly of the machine beyond the vertical position which it reaches by virtue of operation of the cylinder C1, and moves the swing arm and tail folding mechanism to the fully open position shown in FIGURE 1.

Air is admitted to the head end of the cylinder C5 when the clamp button 29 is pressed for tail clamping as described above in conjunction with FIGURES 1 and 2. This causes the piston to extend from the cylinder C5, thereby moving the cranks 65 and 64, the shaft 63 and the tail folding swing arm 25 clockwise a small amount as seen in the FIGURE 5. During the swinging movement of the arm 25 by virtue of operation of the secondary cylinder C5, the tail folding blades move through parallel vertical planes since the cylinder C6 holds the shaft 47 in a fixed position and the rack 45 moves thereover thereby adjusting the pinion 44 and shaft 43 to hold the blades vertical but move the same with respect to the swing arm 25.

The primary swinging of the arm 25 from the vertical position of FIGURE 2 to the folded horizontal position of FIGURE 4 is effected by the cylinder C1 operating through the linkages 64, 65 and 66 on the shaft 63. When the piston is extended by the admission of air to the head end of the cylinder C1, the links cooperate to rotatae the shaft 63 clockwise as viewed in FIGURE 5 and swing the arm rearwardly to the substantially horizontal position of FIGURE 4. The cylinder C5 effectively locks the crank 65 to maintain the desired relation between the mechanisms 64 and 66 during such movement.

Reverse movement is effected, when air is admitted to the piston end of the cylinder C1 and, if desired, simultaneously, air may be admitted to the piston end of the cylinder C5 whereby the swing arm 25 may be brought from its horizontal position to its fully open forwardly extended position of FIGURE 1 in one sweeping motion.

The Tail Folding Mechanism

The tail folding mechanism is shown in detail in FIGURES 6, 7 and 7a. FIGURE 7 is a cross sectional view through the tail folding pivot arm as viewed from the front looking downwardly, and with the tail folding blades 26 and 27 disposed in their folded positions. FIGURE 7a is a fragmental, partly sectional, front view of one of the tail side folding blade pivot mechanisms.

The right and left tail folding blades 26 and 27, as noted above, are secured to pivot shafts 70 and 71 at the upper inner corners thereof journaled in pivot blocks 72 and 73. The pivot blocks are carried on shafts 74 and 75 journaled at their upper ends in the pivot arm 24. These shafts carry pinions 76 and 77 which are meshed with short racks 78 and 79 connected to the pistons of folding cylinders C4 and C2, respectively.

When the left shoulder folding blade 19 is pivoted to the rear of the pattern blade 20 it operates a valve in the pneumatic system for the admission of air to the head end of the cylinder C2 which is mounted on the pivot arm 24. This extends the piston and drives the shaft 75 clockwise through rack and pinion operation whereby the folding blade 27 moves to a position behind the pattern blade 23. Similarly, when the right shoulder folding blade 18 is pivoted about its axis to its rearward, folded position, air is admitted to the head end of the cylinder C4 which is mounted on the pivot arm 24. This causes the rack and pinion 78 and 76 to rotate the shaft 74, thereby moving the right tail folding blade 26 to a position behind the pattern blade 23.

The pivot mountings of the tail folding blades 26 and 27 are effective for the purpose of releasing these blades from the folded article prior to ejecting the article from the mechanism. For this purpose, the pivot shafts 70 and 71 carry pinions 70a and 71a which are meshed, through idlers, with racks 72a and 73a that are slideably mounted in the pivot blocks 72 and 73. The racks 72a and 73a are spring biased upwardly to normally bias the blades 26 and 27 toward their normal, unpivoted position. Stops are provided on the pivot blocks to limit the return positioning of the blades when the blades move under the influence of the springs acting against the racks 72a and 73a.

When the tail side folding blades 26 and 27 are in their folded, closed position, having been pivoted about the axes of the shafts 74 and 75, the racks 72a and 73a are vertically aligned with the pistons of cylinders C11 and C12 mounted at the ends of the mounting blocks for the side folding blades and laterally adjustably secured to the tail folding pivot arm 24.

When the valve V7 is operated by movement of the foot pedal 28 to open the clamps and operate the ejector for removal of the folded garment from the mechanism, cylinders C11 and C12, which are connected in parallel with the clamp operating and ejection cylinders, are actuated. This causes the pistons of the cylinders C11 and C12 to operate against the racks 72a and 73a and cause the blades 26 and 27 to pivot outwardly about the pivots 70 and 71.

The cylinders C11 and C12 are spring returned to their normal position. If desired, however, they may be air returned by controlled exhausting all the pressure end thereof and admitting air to the opposite ends thereof.

The cylinders C2 and C4, which control movement of the blades 26 and 27 from their open positions to their closed positions, are preferably air returned units. The controls for these cylinders are discussed hereinafter in conjunction with the control and pneumatic system. These units are preferably air return units to permit control of the timing and sequence of returning movement. It should be understood that these blades may be spring returned, if so desired, and the return movement may be controlled by controlled exhausting thereof.

The Shoulder Clamping and Folding Mechanism

The whole shoulder clamping and folding mechanism is mounted on a cross arm 80 secured to the free end of the arm 13. The main pattern blade 20a of the pattern blade assembly 20, hereinbefore referred to simply as "the pattern blade 20," is secured to the cross-arm 80 and depends therefrom. The back clamping mechanism 17 shown in FIGURES 3, 8 and 10 and the front and side folding and clamping mechanism are also mounted on the cross-bar 80, but independently of the main pattern blade 20a. The front and side mechanism is independently mounted so that it can be adjusted both vertically for length of fold and laterally for width of fold.

*The back clamping mechanism.*—When the sides of the garment have been folded inwardly, as shown in FIGURE 2, the back clamping mechanism 17 operates to drive a back clamping blade 17a forwardly against the rear of the shoulder and upper side portions of the garment. This is effected by mounting the blade on a pivot arm assembly 82 suspended from a pivot shaft 83 carried on a pair of posts 84 secured to the rearward edge of a cross-arm 80. Another pair of posts 85 extends rearwardly from the cross-arm 80. Adjacent to their rearward ends, the posts 85 pivotally carry the head end of a cylinder C9, the piston of which is pivotally connected at 86 to the pivot arms 82. Admission of air of the head end of the cylinder C9 drives the pivot arms 82 and the back clamping blade 17a forwardly toward the back of the pattern blade assembly 20. When the air is exhausted from the cylinder C9, the back clamp mechanism is returned to its position as shown in FIGURE 10 by springs 87 connected between the posts 85 and the pivot connection 86 on the arms 82 and tensioned in a rearward direction.

*The front shoulder mounting.*—The shoulder folding and clamping mechanism is carried on a mounting blade 90 which is adjustably mounted on the cross-arm 80 for vertical, adjustable movement thereof with respect to the fixed, main pattern blade 20a. This vertical adjustability permits adjustment of the collar clamp 14 with respect to the lower edge of the pattern blade assembly 20, thereby adjustably controlling the length of the folded package. When the clamp 14 is lowered with respect to the bottom edge of the pattern blade assembly, the top of the garment or collar thereof will be closer to the edge of the blade assembly 20, thereby resulting in a shorter folded package.

For this vertical adjustability, the mounting plate 90, on its rearward surface, carries a pair of vertically disposed, laterally spaced dovetail slides 91 which fit and slide in vertical dovetail guide slots 92 seen in FIGURES 8 and 8a. When the mounting blade 90 is in an adjusted position, it may be locked in that position by clamping screws 93 having handles thereon and being threaded through apertures extending from the rear face of the cross-arm 80. When threaded in, these screws bear against the dovetail slides 91 from the right side thereof and clamp the same in a fixed position. When the clamping screws 93 are loosened, the mechanism may be adjusted vertically by operation of a handle 94 on a pinion shaft 95 journaled in bearing blocks 96 secured to the top of the cross-arm 80. The pinion shaft 95 carries a pair of pinions 97 which mesh with a pair of racks 98 secured to the back face of the mounting plate 90 and which are accommodated in appropriately milled slots 99.

Rotation of the handle 94 in a clockwise direction as viewed in FIGURES 8 and 10 will cause the mounting plate to move upwardly, thereby effectively increasing the length of fold. Rotation of the handle 94 in a counter-clockwise direction will shorten the length of fold by moving the mounting plate and the clamping and folding mechanisms carried thereon downwardly closer to the bottom edge of the pattern blade assembly.

*Width adjustment.*—For adjustability of width of fold, the left and right shoulder folding blades and mechanism are mounted on carriage blocks 100 and 101 on the rear surfaces of which there are guide blocks 102 and 103 which extend through guideways in the mounting plate 90 and in the fixed pattern blade 20a. Racks 104 and 105 secured to the guide blocks 102 and 103 engage helical gears or screw gears 106 and 107 which are right and left hand threaded, respectively. These helical gears are secured to a screw shaft 108 journaled in a pair of bearing blocks 109 mounted on the rear surface of the fixed pattern blade 20a.

A screw driver slot or wrench socket 110 is provided in the end of the shaft 108 to permit convenient rotational movement thereof and of the helical gears 106 and 107. This rotation of the shaft 108 and the gears thereon in one direction will cause the racks 104 and 105 to move closer together, while rotation thereof in an opposite direction will cause the racks to move laterally apart. Lateral movement of the racks causes lateral movement of the carriage blocks 100 and 101, whereby the shoulder folding blades 18 and 19 carried thereon will be moved laterally. Pattern blade side segments 111 and 112 also will be moved laterally with the carriage blocks to increase and decrease the effective width of the pattern blade assembly 20. These lateral pattern blade segments 111 and 112 provide for adjustment of the width of the face of the fixed pattern blade 20a and effectively form a part thereof for folding the garment hereabout.

*The shoulder folding blade pivot mounting.*—The pivot mountings for each of the shoulder folding blades 18 and 19 are shown in FIGURES 6 and 9. Therein it will be seen that each of the shoulder folding blades is carried on a pivot block 113 journaled on a pivot shaft 114 secured to the carriage blocks 100 and 101. The springs 115 disposed about the shafts 114 each have one end thereof connected to a shaft and the other end thereof connected to a bearing block whereby the blades 18 and 19 are biased outwardly toward an open position as seen in FIGURE 6.

This pivot mounting permits substantially 180° movement of the shoulder folding blades from their outward, extended, open position to a rearward position behind the pattern blade assembly 20.

*The collar clamping mechanism.*—for clamping the collar portion of the garment to be folded against the pattern blade assembly 20, the mechanism is provided with a spring biased collar clamp 14 having a pair of clamp heads 116 facing the pattern blade assembly immediately below the carriage blocks 100 and 101 and mounted on a pair of clamp arms 117 which are secured together and pivotally mounted at their upper ends at 118 on a pair of forwardly projecting posts 119 secured to the mounting plate 90. The arms 117 are crank shaped on their upper ends adjacent to the pivot axis 118 and at the rearward ends thereof are attached to clamp biasing springs 120, the upper ends of which are connected to a spring tensioning plate 121.

The clamp opening cylinder C7 is secured to the mounting plate 90 with its piston end projecting downwardly and carrying a clamp opening cam 122. The cam has a tapered lower end 123 that cooperates with a roller 124 disposed between the arms 117 so that when the cylinder is actuated to move the piston downwardly, the thicker upper portion of the cam 122 rides under clamp follower roller 124 to move the clamp pads 116 downwardly from the pattern blade assembly 20. Backing rollers 125 on the cam ride on a pad 126 on the mounting plate 90 to assure proper cam operation.

When the cylinder C7 is exhausted, springs 127 secured between the spring tensioning bracket 121 and a cross-bar 129 on the cam 122 cause the cam to retract thereby permitting the springs 120 to close the clamp 14 with the pads 116 bearing across the pattern blade assembly 20 or a garment disposed in position under the pads.

*The shoulder clamps.*—The shoulder clamps 15 and 16 are opened substanially simultaneously with the opening of the collar clamp since they are also operated by the cylinder C7. When cylinder C7 is energized to lower the cam 122 and the cross-bar 129, the cross-bar 129 strikes upwardly projecting ears 130 on the shoulder clamp latch cam bars 131 at the inner ends thereof. The cross-bar 129 depresses the inner ends of the latch cam 131 so that the inwardly projecting finger ends thereof latch under pivotally mounted, spring biased latches 132. The latches 132 are substantially C-shaped and the upper, laterally projecting ends thereof are the portions which latch over the inwardly projecting fingers on the latch cam bars 131. The latches 132 are pivotally mounted on the carriage blocks 100 and 101. The latch cam bars 131 are pivotally mounted as at 133 on the side folding blades 18 and 19 so that the outer ends thereof move upwardly while the inner ends are being depressed.

The outer ends of these latch cam bars are cam shaped as shown in FIGURE 11 and cooperate with rollers 134 on the uppper ends of the shoulder clamps 15 and 16 as seen in FIGURE 11. As the end of the bar 131 moves upwardly, it drives the roller 134 inwardly and causes the shoulder clamp bar 16 of FIGURE 11 to pivot about its pivot mounting 135 on a block 136 attached to the side folding blade 19 so that the lower, clamping end of the clamp 16 moves outwardly against the force of a biasing spring 137 disposed between the upper portion of the clamp bar and an upwardly projecting portion of the block 136.

These shoulder clamps, as distinguished from the collar clamp, are individually released by deliberate movement of the side folding blades by the operator. When the operator has positioned, for example, the left shoulder under the clamping end of the left shoulder clamp 16, she pivots the blade about the shaft 114 until the inwardly projecting finger and the inward end of the latch bar moves out from under the latch 132. The spring 137 then causes the clamp 16 to move to a clamping position as the roller 134 forces the outer end of the cam latch bar 131 downwardly. The same type of operation is effective with the right shoulder folding blade.

*The ejector.*—As noted in the earlier portion of this specification, when the garment is fully folded, the operator may partially remove the garment from the machine by stepping on the foot pedal 28 to operate the pneumatic system. When the foot pedal is depressed, the cylinder C8 is actuated. The piston of that cylinder is connected to a cross-bar 140 which has secured to it a pair of laterally spaced elongated ejector plates 141 slideably disposed behind the main pattern blade 20a. The lower ends of the ejector blades 141 are coincidental with the lower end of the main blade 20a when the piston of the cylinder C8 is fully rejected. When the piston is extended, these blades move downwardly or forwardly, parallel to the plane of the main blade 20a and push the folded garment forwardly as viewed in FIGURE 4. Springs 142 return the ejector mechanism to its starting position when air is exhausted from the cylinder C8.

The Pneumatic System

The pneumatic system is illustrated diagrammatically and schematically in FIGURE 12 and is most conveniently explained in conjunction with the details of the operation of the illustrative embodiment of the invention shown in the other drawings and described hereinabove. The starting or fully open position of the machine is illustrated in FIGURE 1. In order to place a coat on the machine, the operator depresses the foot pedal 28 which shifts the valve V7 by a linkage 143 tying the foot pedal to the valve. Shifting of the valve V7 admits air from the main air entry line 144 through the regulator 145 to the cylinder C7 via the short dashed line 146. Actuation of the cylinder C7 opens the collar clamp and the shoulder clamps.

The operator then puts the garment in place with the collar under the collar clamp and releases the foot pedal. The valve V7 is spring biased and returns to its normal position thereby exhausting cylinder C7 permitting the spring connected to the clamp cross-bar 129 to retract the same thereby closing the collar clamp.

Here it may be noted that the ejector cylinder C8 is operated in parallel with and simultaneously with the collar clamp cylinder for operation of the ejector blades. The operation of that cylinder during loading of the machine, however, is inconsequential. During removing of the garment from the machine, the cylinder C8 pushes the ejector blades and the garment from the machine as the clamps are released.

With the collar of the garment held under the collar clamp, the operator positions the shoulders of the garment under the shoulder clamps and by pivotal movement of the shoulder and side folding blades releases and sets the clamps to hold the garment. She then presses the button 29 which momentarily operates two control valves CV3 and CV5. These valves momentarily exhaust air lines 147 and 148 shown by long dashed lines in the drawing, to shift four-way valves V3 and V5. Valves V3 and V5, when shifted, admit air from the main line and regulator to the head ends of the cylinders C3 and C5, respectively. The cylinder C3 causes the tail clamp arm 22 to swing down closing the tail clamping blade 21 against the back of the garment. Actuation of the cylinder C5 causes the tail folding mechanism to move from its forward extended position to a substantially vertical position so that the garment is clamped between the tail pattern blade and tail clamping blade.

As the cylinders C3 and C5 move to their fully extended position to close the tail clamping and folding blades against the garment, they operate safety valves SV2 and SV2a, respectively, permitting further operation of the machine and specifically permitting the folding operations to proceed. Specifically, if these valves are not operated, they prevent the control valve CV2 on the left shoulder folding blade from operating and thereby prevent the cylinder C2 for the left tail folding blade from operating.

The operator inspects the clamped garment and then pivots the left side and shoulder folding blade 19 about its vertical axis to a position behind the pattern blade assembly 20. This movement of the blade 19 causes actuation of the control valve CV2 in series with safety valves SV2a and SV2 successively to exhaust one side of the four-way valve V2 through each, when shifted, air is admitted from the regulator to the cylinder C2 via the short dashed line 149. Shifting of the valve V2 also admits air to the safety control cylinder SC2 which, when actuated, trips the safety valves SV4 and SV6 which are in series with control valves CV4 and CV6 for operating the right side tail folding blade and the tail folding swing arm. Unless the valves SV4 and SV6 are operated, operation of the machine cannot continue.

Assuming that all is in order, the operator holds the left side shoulder folding blade in its folded position and then pivots the right shoulder folding blade 18 to its position behind the pattern blade assembly 20 and the left shoulder folding blade 19. This movement of the blade 18 trips the control valve CV4 which operates through the control valve SV4 to exhaust one side of and shift the valve V4. Shifting the valve V4 causes air to flow from the regulator to the cylinder C4 thereby causing the right tail folding blade 26 to pivot about its vertical axis thereby completing folding of the right side of the machine. The shifting of valve V4 also causes the back clamp cylinder C9 to operate to close the back clamp blade assembly 17 against the back of the garment and hold the same in a folded condition so that the operator may release the garment and permit the machine to continue its operating sequence automatically.

When the right tail folding blade 26 closes, it trips control valve CV6 which operates through the safety valve SV6 to exhaust one side of and shift the control valve V6 thereby admitting air to the cylinder C6 at the piston end thereof. This causes the piston to retract and operating through the rack and pinion system causes the tail folding mechanism to pivot about the axis of the tail pivot bar 24 to fold up the tail to the position shown in FIGURE 3. At the same time, air is admitted from the valve V6 to the control cylinder CC3 which trips the reversing control valve CVR3 thereby reversing the shifting of valve V3 and admitting air to the piston end of the cylinder C3 to pivot the clamp blade 21 and the swing arm 22 rearwardly out of the folded garment. These actions of movement of the clamp blade 21 and the tail folding assembly occur substantially simultaneously. When the valve V6 shifts for the admission of air to the piston end of the cylinder C6, air is also admitted to the safety cylinder SC10 which locks the start button 29 against reactuation of control valve CV3 to prevent movement to the arm and clamping blade downward until the mechanism is restored to its starting position.

At about one-half of the travel of movement of cylinder C6, the rack connection to the piston trips the control valve CV1 to shift the valve V1 for the admission of air to the head end of the cylinder C1. The timing of this arrangement is such that the cylinder C1 commences its operation as soon as the mechanism reaches its tail folded condition shown in FIGURE 3. At this stage, the cylinder C6 continues its movement while the cylinder C1 is moving. The cylinder C1 causes the shoulder supporting arm 13 to move rearwardly and downwardly and causes the tail swing arm 25 to move upwardly and rearwardly simultaneously. Continued movement of the cylinder C6 causes continued operation of the rack and pinion system for the tail pivot arm to retain the tail in its folded position inasmuch as the rack and pinion system is in part dependent upon the position of the tail folding swing arm 25. When the cylinders C1 and C6 conclude their movement in a forward operating direction, the garment is in a fully folded position as shown in FIGURE 4.

The operator may then readily remove the garment from the mechanism by depressing the foot pedal 28 which shifts the valve V7 to operate the clamping cylinder C7 thereby opening the collar and shoulder clamps and to operate the cylinder C8 to cause the ejector blades to push the garment off of the pattern blade assembly 20. Cylinders C11 and C12 are connected in parallel with clamping cylinder C7 and ejector cylinder C8. The cylinders C11 and C12 are preferably fast acting cylinders and operated to move the tail side folding blades 26 and 27 out of the folded garment before the garment is stressed; which it would be if the tail side folding blades were in place within the garment when the ejector is operated.

Depression of the foot pedal, as noted above, operates the cylinders C7 and C8 to unclamp the garment and to cause the ejector blades to push the garment off of the pattern blade. While holding the foot pedal depressed, the operator simply pulls the garment from the mechanism.

Before depressing the foot pedal, the operator may bag, pin or band the garment, if so desired.

When the operator releases the foot pedal 28, the spring return movement thereof trips the reversing control valve CVR1 to initiate the return, unwinding cycle of operation of the mechanism.

Tripping the valve CVR1 reverse shifts the valve V1 thereby admitting air to the piston end of the cylinder C1 to retract the piston and simultaneously raise the shoulder folding mechanism and lower the tail folding mechanism. In the course of its movement, the piston for the cylinder C1 trips reversing control valves CVR5 and CVR6 to shift valves V5 and V6 to a return position thereby re-extending the piston for the cylinder C6 and retracting the piston for the cylinder C5. Movement at cylinder C5 results in forward extension of the tail folding mechanism while re-extension of the cylinder C6 causes the tail folding pivot arm 24 to rotate to its unpivoted position to open the tail folding assembly. During the course of travel of the cylinder C6 in its reverse direction, the reverse control valves for the tail folding blades, valves CVR4 and CVR2, are tripped successively to successively shift the valves V4 and V2 to air return cylinders C4 and C2 thereby opening the tail folding blades 26 and 27 in the stated order.

During this opening movement, the right and left shoulder folding blades are spring returned to their open position.

If at any stage during the operation of the machine the operator wishes to stop operation and return the mechanism to its normal starting position, she merely presses the reset control button 30 and depresses the foot pedal 28. Depressing the foot pedal and releasing the same trips the reverse control valve for the cylinder C1 causing the swing arms to return to their normal position. Pressing the reset control button 30 trips auxiliary reverse control valves CVR2a through CVR6a for reverse actuation of all of the other cylinders and mechanisms.

It will be readily observed from the foregoing that numerous variations and movements may be effected without departing from the true spirit and scope of the novel concepts and principles of this invention.

I claim:

1. A device for folding articles of flexible material suspended in a substantially vertical hanging position, including a folding mechanism comprising means to clamp the upper portion of the article to suspend the same, means to clamp the lower portion of the article, means to fold the side portions of the article inwardly of the central portion substantially along vertical lines, means to fold the lower portion of the article upwardly about a pre-established substantially horizontal line, and means to fold the upper portion and the lower portion along a second pre-established substantially horizontal line to overlie each other.

2. A device for folding articles of flexible material suspended in a substantially vertical hanging position, including a folding mechanism comprising means to clamp the upper portion of the article to suspend the same, means to clamp the lower portion of the article, means to fold the side portions of the article inwardly of the central portion substantially along vertical lines, means a pre-established substantially horizontal line, means to fold the upper portion and the lower portion along a second pre-established substantially horizontal line to overlie each other, and means to eject the folded article from the mechanism.

3. A device for folding articles of flexible material suspended in a substantially vertical hanging position, including a folding mechanism comprising means to clamp the upper portion of the article to suspend the same, means to clamp the lower portion of the article, means to fold the side portions of the article inwardly of the central portion substantially along vertical lines, means to clamp the side portions of the article when the same are folded inwardly of the central portion of the article, means to fold the lower portion of the article upwardly about a pre-established substantially horizontal line, and means to fold the upper portion and the lower portion along a second pre-established substantially horizontal line to overlie each other.

4. A device for folding articles of flexible material suspended in a substantially vertical hanging position, including a folding mechanism comprising means to clamp the upper portion of the article to suspend the same, means to clamp the lower portion of the article, means to fold the side portions of the article inwardly of the central portion substantially along vertical lines, means responsive to folding of the side portions of the article to substantially automatically operate means to fold the lower portion of the article upwardly about a pre-established substantially horizontal line, and means to fold the upper portion and the lower portion along a second pre-established substantially horizontal line to overlie each other.

5. A device for folding articles of flexible material suspended in a substantially vertical hanging position, including a folding mechanism comprising means to clamp the upper portion of the article to suspend the same, means to clamp the lower portion of the article, means to fold the side portions of the article inwardly of the central portion substantially along vertical lines, means to fold the lower portion of the article upwardly about a pre-established substantially horizontal line, and means to fold the upper portion and the lower portion along a second pre-established substantially horizontal line to overlie each other, said means to clamp the lower portion of the article including an arm for releasing said last mentioned clamp when the means to fold the lower portion of the article upwardly about a pre-established substantially horizontal line, is operated.

6. A device for folding articles of flexible material suspended in a substantially vertical hanging position, including a folding mechanism comprising means to clamp the upper portion of the article to suspend the same, said means including a clamping mechanism operative at the upper central portion of the mechanism, and clamping means at the upper lateral portions of the mechanism and being individually controllable, means to clamp the lower portion of the article centrally thereof, means to fold the side portions of the article inwardly of the central portion substantially along vertical lines about the means to clamp the lower portion of the article, means to fold the lower portion of the article upwardly about a pre-established substantially horizontal line, means to fold the upper portion and the lower portion along a second pre-established substantially horizontal line to overlie each other.

7. A folding mechanism for folding articles of flexible material suspended in a substantially vertical hanging position, comprising a support structure, drive means mounted on said support structure, an upper folding assembly mounted on said support structure and arranged to be driven by said drive means, means to clamp the upper portion of the article to suspend the same at said upper folding assembly, a lower folding assembly mounted on said support structure and arranged to be driven by said drive means, means including elements in both said upper folding assembly and said lower folding assembly coordinated to fold the side portions of the article inwardly of the central portion substantially along vertical lines, means to fold the lower portion of the article upwardly about a pre-established substantially horizontal line, and means to fold the upper portion and the lower portion along a second pre-established substantially horizontal line to overlie each other.

8. A folding mechanism for folding articles of flexible material suspended in a substantially vertical hanging position, comprising a support structure, an arm mounted on said support structure, a pattern blade secured to said arm and depending therefrom, side folding blades supported on said arm adjacent to said pattern blade, the support for said side folding blades including pivot mountings therefor, means to laterally adjust the position of said side folding blades, and clamping means to engage and hold the upper portions of the article at the center thereof and adjacent to the lateral sides thereof.

9. A folding mechanism for folding articles of flexible material suspended in a substantially vertical hanging position, comprising a support structure, an arm mounted on said support structure, a pattern blade secured to said arm and depending therefrom, side folding blades supported on said arm adjacent to said pattern blade, the support for said side folding blades including pivot mountings therefor, means to laterally adjust the position of said side folding blades and the width of said pattern blade, and clamping means to engage and hold the upper portions of the article at the center thereof and adjacent to the lateral sides thereof.

10. In a folding device for folding articles of flexible material suspended in a substantially vertical hanging position, means to fold the side and lower portions of the article, comprising a form about which the article is to be folded, side folding arms disposed at the side edges of the form, said side folding arms being pivotally mounted for pivotal movement along substantially vertical axes substantially parallel to the side edges of the form and means to pivotally move the form and the side folding arms about a substantially horizontal axis substantially perpendicular to the first mentioned axis to fold the article upwardly upon itself.

11. In a folding device for folding articles of flexible material suspended in a substantially vertical hanging position, means to fold the side and lower portions of the article, comprising a form about which the article is to be folded, side folding arms disposed at the side edges of the form, said side folding arms being pivotally mounted for pivotal movement along substantially vertical axes substantially parallel to the side edges of the form, means to pivotally move the form and the side folding arms about a substantially horizontal axis substantially perpendicular to the first mentioned axis to fold the article upwardly upon itself, and means to drive the side folding arms about the first mentioned pivot axis therefor.

References Cited in the file of this patent
UNITED STATES PATENTS

| | | |
|---|---|---|
| 2,616,594 | Calder et al. | Nov. 4, 1952 |
| 2,639,065 | Forse et al. | May 19, 1953 |
| 2,687,832 | Westwood | Aug. 31, 1954 |

UNITED STATES PATENT OFFICE
CERTIFICATE OF CORRECTION

Patent No. 3,148,807                                    September 15, 1964

David A. Freeman

It is hereby certified that error appears in the above numbered patent requiring correction and that the said Letters Patent should read as corrected below.

Column 6, line 65, for "rotatae" read -- rotate --; column 9, line 29, for "htereabout" read -- thereabout --; column 10, line 4, for "substanially" read -- substantially --; line 10, after "cam" insert -- bars --; line 24, for "uppper" read -- upper --; column 13, line 53, after "means" insert -- to fold the lower portion of the article upwardly about --.

Signed and sealed this 9tn day of February 1965.

(SEAL)
Attest:

ERNEST W. SWIDER                                    EDWARD J. BRENNER
Attesting Officer                                        Commissioner of Patents